(12) United States Patent
Kavvadias et al.

(10) Patent No.: US 7,682,683 B2
(45) Date of Patent: Mar. 23, 2010

(54) STRETCH FILM

(75) Inventors: Harilaos Kavvadias, Crete (GR); Damianos Markakis, Crete (GR)

(73) Assignee: Mega Plast S.A., Heraklion, Crete (GR)

( * ) Notice: Subject to any disclaimer, the term of this patent is extended or adjusted under 35 U.S.C. 154(b) by 209 days.

(21) Appl. No.: 10/501,799

(22) PCT Filed: Dec. 9, 2002

(86) PCT No.: PCT/EP02/13938

§ 371 (c)(1), (2), (4) Date: Jul. 16, 2004

(87) PCT Pub. No.: WO03/059750

PCT Pub. Date: Jul. 24, 2003

(65) Prior Publication Data

US 2005/0118391 A1    Jun. 2, 2005

(30) Foreign Application Priority Data

Jan. 16, 2002  (DE) ............................... 102 01 480

(51) Int. Cl.
B32B 3/24 (2006.01)

(52) U.S. Cl. .................. 428/138; 428/134; 428/136; 428/137

(58) Field of Classification Search ................ 428/134, 428/136, 137, 138
See application file for complete search history.

(56) References Cited

U.S. PATENT DOCUMENTS

| 3,987,592 A | 10/1976 | Herminghaus et al. |
| RE29,524 E | 1/1978 | Spencer |
| 4,410,587 A | 10/1983 | Fair et al. |
| 4,587,175 A | 5/1986 | Akao |
| 4,758,297 A * | 7/1988 | Calligarich ............... 156/251 |
| 4,963,412 A | 10/1990 | Kokeguchi |
| 5,935,681 A * | 8/1999 | Paulett ...................... 428/137 |
| 2005/0123721 A1 | 6/2005 | Heikaus et al. |

FOREIGN PATENT DOCUMENTS

| DE | 1857459 | 7/1964 |
| DE | 4320141 | 12/1994 |
| DE | 100 27 527 A 1 | 12/2001 |
| EP | 0 418 773 A2 | 3/1991 |
| EP | 820 856 A1 | 1/1998 |
| EP | 0909721 | 4/1999 |
| GB | 900083 | 7/1962 |
| WO | WO 89/04759 | 6/1989 |
| WO | WO 91/18735 | 12/1991 |
| WO | WO 01/60709 A1 * | 8/2001 |

* cited by examiner

*Primary Examiner*—William P Watkins, III
(74) *Attorney, Agent, or Firm*—D. Peter Hochberg; Sean F. Mellino; Daniel J. Smola

(57) ABSTRACT

A stretch film with a base (1) consisting of a film material and with a multitude of holes (2) that are formed in the base (1) in several rows (3) of holes extending, in essence, in parallel to each other and in a main direction (X) comprises at least one layer of strips (4) consisting of a film material and extending in the main direction (X), said layer being arranged on the base (1) between the rows (3) of holes. Owing to the applied strips (4), a high stretchability of the stretch film can be achieved.

7 Claims, 3 Drawing Sheets

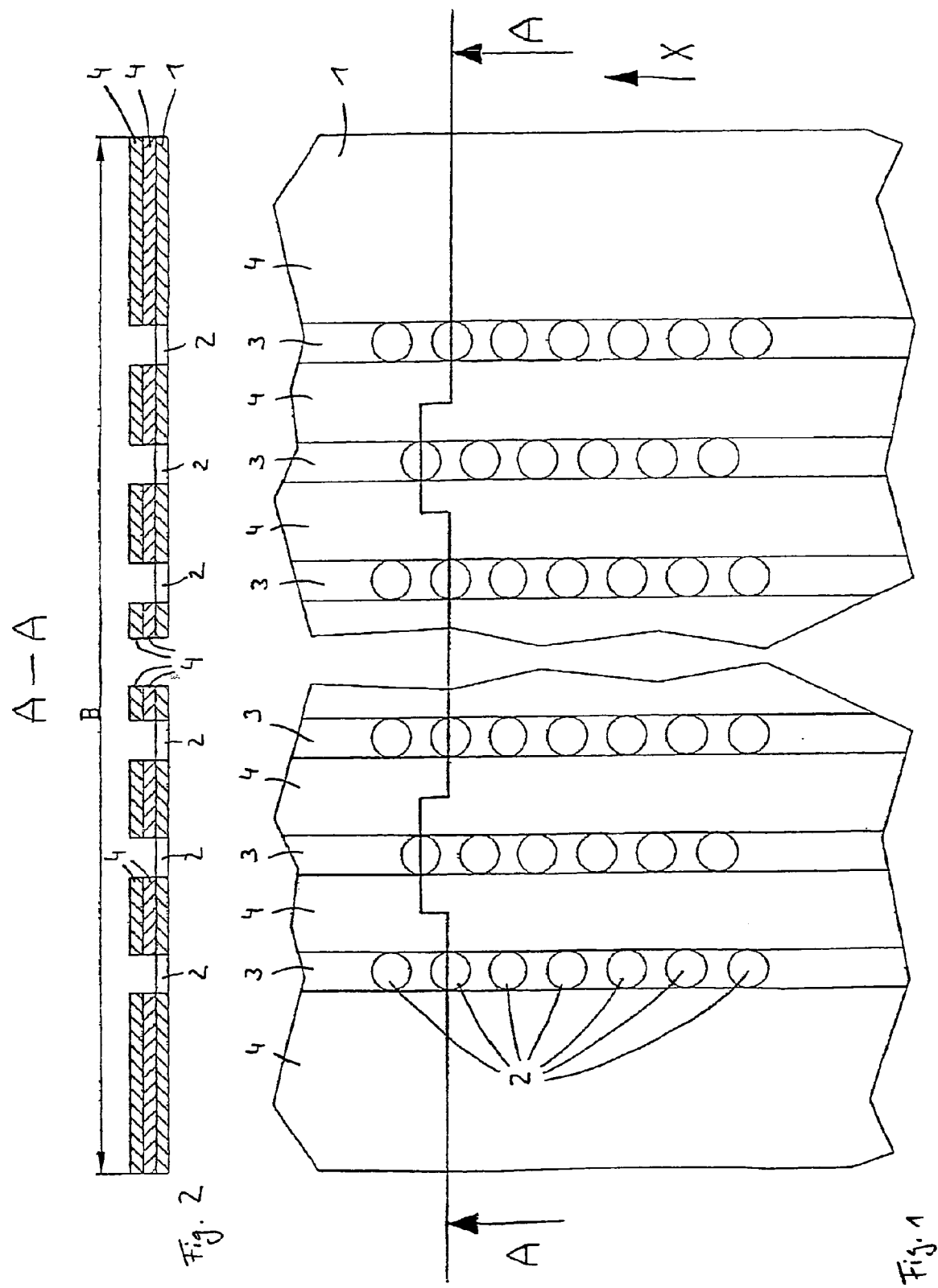

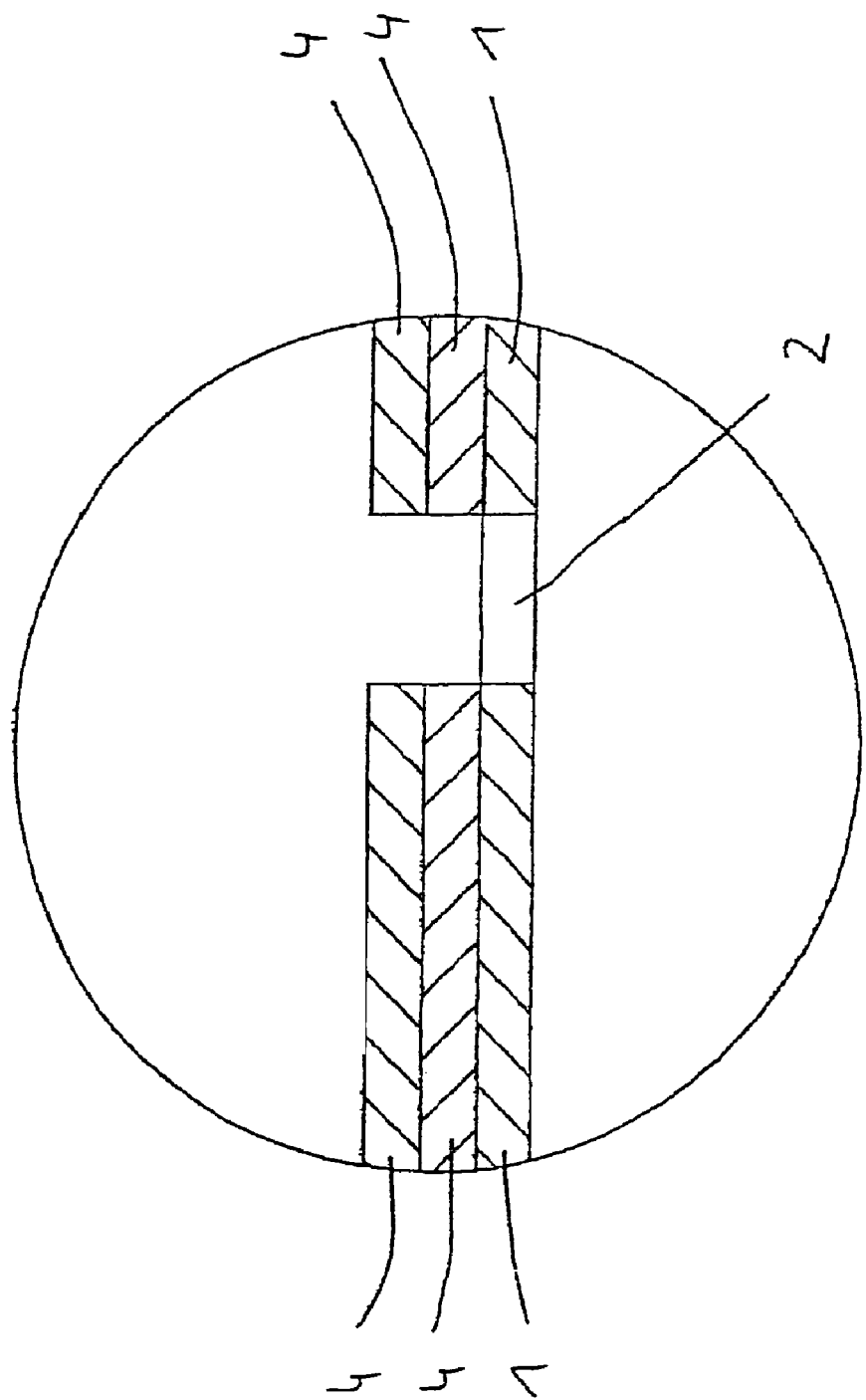
Figur 3

STRETCH FILM

CROSS REFERENCE TO RELATED APPLICATIONS

This application is the national phase of PCT/EP02/13938, filed Dec. 9, 2002, which claims priority from German application DE 102 01 480.9 filed Jan. 16, 2002.

BACKGROUND OF THE INVENTION

1. Field of the Invention

The present invention relates to a stretch film comprising a base consisting of a film material, and a multitude of holes formed in the base, the holes extending in several rows, in essence, in parallel to each other and in a main direction.

2. Description of the Prior Art

The use of perforated plastic stretch films is known in the packaging of pallets, straw bales, fruit, etc., in order to allow adequate stretchability as well as ventilation of the items to be packaged. A prestretched plastic stretch film is known from EP-820 856 A1, wherein holes are generated by utilizing a thermal irradiation method without touching the film and, thus, without wasting the film, e.g. in the form of perforations. The production method described therein is, for example, also utilized in the production of plastic nets, such as they are described in DE 100 27 527 A1.

Perforated stretch films may pose the problem of tears developing at the edges of the holes when the stretch film is stretched at a future point. These tears do not only disturb the outer appearance of the film but may also form the starting point of a complete tearing, at least, however, of a considerable weakening of the film.

The invention aims at specifying a stretch film permitting high stretching rates without the film tearing at the edges of the holes. This task is solved according to the invention, a stretch film comprising a base consisting of a film material, and a multitude of holes that are formed in the base, the holes extending in several rows in parallel to each other and in a main direction so that at least one layer of strips consisting of a film material and extending in the main direction is attached to the base between the rows of holes.

Preferred further developments of the invention are specified in the dependent claims.

SUMMARY OF THE INVENTION

A stretch film according to the invention is characterized in that at least one layer of strips consisting of a film material is attached to the base between the row of holes, wherein the strips extend in the main direction. The strips strengthen the film material of the base between the rows of holes, thus preventing tears from developing and, in particular, from spreading.

In a particularly preferred embodiment of the invention, the width of at least a part of the strips extending in transverse direction in relation to the main direction is dimensioned such that the strips each reach up to the row of holes adjacent to said strips. That means that the film strips applied to the base (the base film) abut on the rows of holes in tangential direction and can even touch the edges of the holes. Stated another way, respective pairs of adjacent strips are disposed on both sides of a row of holes and the width of the separation between at least a part of the respective adjacent pairs of strips extending in transverse direction in relation to the main direction, is dimensioned such that the strips each reach up to the row of holes adjacent to the strips to define between the pair of the respective adjacent strips a fixed width for the holes extending in the transverse direction, wherein the holes maintain the fixed width when the stretch film is stretched in the main direction. As a result, those parts of the base where it is most probable that the stress concentration effect caused by the holes leads to the development of tears, are strengthened by the additionally applied film strips.

In a further preferred embodiment of the invention, several layers of strips are applied to the base one above the other, wherein the strips that are arranged one above the other each comprise the same width. Thus, the stretch film reaches a higher strength in addition to its increased stretchability.

The strips attached to the base are to particular advantage in that they abut on the base, in essence evenly, but at least without any wrinkles and without any curls. This results in a large-area contact and a close fit between the base and the strips so that the stresses developing in the film material when it is stretched can even be transferred beyond the boundary surfaces in the form of shear stresses. If they comprised wrinkles or curls, the strips would not be able to absorb stresses from the base film to a relevant extent because, on the contrary, the wrinkles or crimps would be the first to be leveled during stretching of the base film.

Therein, it is to particular advantage that the strips are attached to the base or the associated strips carrying said strips by adhesion. In other words, the strips can be attached without sealing or bonding being necessary.

The holes in the base can, to particular advantage, be made by utilizing a thermal irradiation method without touching the base, with each hole being, thereafter, surrounded by a bead having a thickness that exceeds the thickness of the base. A corresponding production method is described in EP 820 856 A1.

It is to particular advantage when the holes of neighboring rows of holes are staggered in relation to the main direction. That means that the holes of two neighboring rows of holes are not arranged on the same line in relation to the main direction. As a result, each hole is adequately surrounded by film material, this being of benefit to the stretchability.

A further embodiment of the invention is characterized in that the entire stretch film, that is the base including strips, is prestretched. In other words, the stretch film becomes thinner as a whole and less material must be used per unit of length of the stretch film. Such a stretch film is, in particular, known for winding machines which cannot utilize the increased stretchability of the non-prestretched stretch film, so that any handling of the non-stretched stretch film would be of economical disadvantage.

DESCRIPTION OF THE DRAWINGS

This and further advantages and elements of the invention will be illustrated in more detail below, by means of an example using the accompanying figures, in which:

FIG. 1 is a top view of a part of the stretch film according to the invention;

FIG. 2 is a sectional view taken from lines A-A in FIG. 1;

FIG. 3 is a magnified detail view of a hole shown in FIG. 2; and

Figure 4:
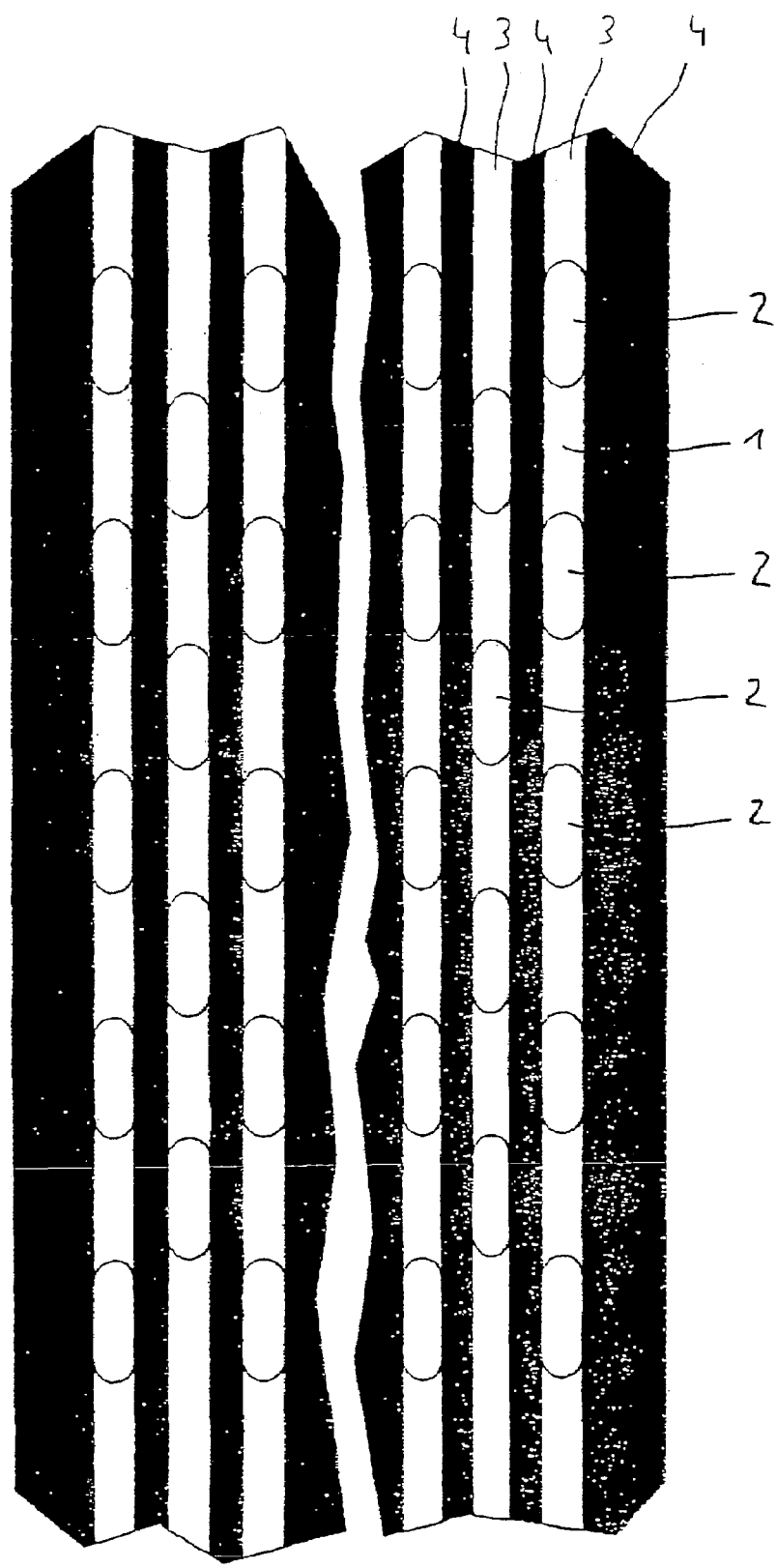
FIG. 4 is a top view of the stretch film of FIG. 1 after a stretching cycle.

Since they show various views of the same stretch film, FIGS. 1 through 3 will be used jointly for illustration.

DESCRIPTION OF THE PREFERRED EMBODIMENTS

In a base 1 consisting of a film material and having the width B, a multitude of holes 2 are, for example, formed by utilizing the method described in EP 820 856 A1, said holes 2 being provided in the form of several rows 3 of holes that are, in essence, arranged in parallel to each other and in a main direction X. The base 1 has a great length and can be wound and unwound in direction X.

According to the production method described in EP 820 856 A1, a bead surrounding each hole 2 having a thickness that exceeds a thickness of the base 1 is developing after exposure to heat. This bead allows the film surrounding the hole 2 to be stretched to a higher extent, without a tear developing at the edge of the hole.

Strips 4 consisting of a film material are attached to the base 1 between the rows 3 of holes. Said strips 4 extend along the main direction X. Their width is dimensioned such that the strips each reach up to the rows of holes 3 adjacent to said strips. Ideally, the strips 4 end exactly where the edges of the holes are positioned, wherein it is of no harm if the strips 4 project a little beyond the edges of the holes, thus covering a small part of the holes 2. At the outer edges of the base 1 (outer left and outer right in FIGS. 1 and 2), the strips 4 cover the upper side of the base 1 entirely up to the edge.

As can be seen from FIGS. 2 and 3, two layers of strips 4 are attached to the base 1 one above the other. It is, however, also possible to apply to the base 1 only one strip 4, but also even more strips one above the other. The top and bottom of the reinforcing strips, which are defined by the length and width of the strips, are the major planar faces. The reinforcement strips are only attached to the base and to each other at the major planar faces. As has been found out, an optimum stretchability of the stretch film can be achieved with two layers of strips 4. While it is not possible to improve the stretchability by further increasing the number of layers, the strength can be increased to a considerable degree.

Use is not made of bonding or sealing measures to attach the strips 4 to the base 1 or to the respective underlying strip 4. Instead, the strips 4 can be pressed on and will reliably be fixed by adhesion.

It is important that the strips 4 abut on the base 1 as evenly as possible and without any wrinkles or curls. As a result, tears are reliably prevented from developing at the edges of the holes 2, thus permitting to achieve higher stretching rates. Any kinks, buckles or warps caused in the strips by exposure to heat are harmless as long as a large-area contact between the entire strip surface and the base 1 is ensured.

LLDPE (linear low-density polyethylene) is suitable as film material, if necessary with an admixture of linear very-low-density PE. The base 1 and the strips 4 can consist of the same film material. In certain cases of application, however, it is also conceivable that different film materials be used, for example even for different layers of strips.

According to specifications, the stretch film can, for example, be dimensioned such that the holes are 12 mm in diameter and, for example, 18 strips 4 can be attached to the film side by side. The width B of the base can range from 500 to 700 mm.

Preferably, use can be made of the stretch film according to the invention by means of winding machines which utilize the excellent stretchability of, for example, 200 percent, in order to obtain an adequate material yield.

It is, furthermore, possible to prestretch the stretch film according to the invention, for example, by 100 percent. The resulting film product is, in particular, suitable for winding machines which are not able to fully utilize the high stretchability (e.g. 200 percent). The prestretched stretch film is less expensive because less material is required per length. As a consequence, it is even possible to economically operate winding machines which cannot utilize the actual stretchability of the stretch film according to the invention.

FIG. 4 is a top view of the stretch film according to FIG. 1 after the stretch film has been stretched by 250 percent. To make this clearer, the strips 4 are blackened. It can be well recognized that the holes 2 have been stretched wherein their edges that are adjacent to the strips 4 are supported by the strips 4, i.e. the holes have maintained their fixed width in the transverse direction, such that the formation of tears can be reliably prevented.

The invention has been described with particular emphasis on the preferred embodiments. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention or the equivalents thereof.

The invention claimed is:

1. Stretch film comprising a base consisting of a film material;
   a multitude of holes, said holes being formed in the base in several rows extending in parallel to each other and in a main direction;
   said stretch film further comprising:
      at least two layers of reinforcing strips consisting of a film material and extending in the main direction wherein said at least two layers of strips are attached to the base one above the other between the rows of holes, wherein said at least two layers of strips are only attached to the base and to each other at their major planar faces and wherein respective pairs of adjacent strips are disposed on both sides of a row of holes, said at least two layers of strips being devoid of said holes;
   wherein the width of at least a part of the separation between the respective adjacent pairs of strips extending in transverse direction in relation to the main direction, is dimensioned such that the strips each reach up to the rows of holes adjacent to said strips to define between said respective pairs of adjacent strips a fixed width for said holes extending in the transverse direction, for preventing the development of tears in the film material and for preventing the spreading of such tears;
   wherein the strips are generally even, but at least without wrinkles; and
   wherein each hole is surrounded by a bead having a thickness that exceeds a thickness of the base.

2. Stretch film according to claim 1, wherein the strips are attached to the base or the associated strip carrying said strips by adhesion.

3. Stretch film according to claim 1, wherein the strips are applied without sealing or bonding.

4. Stretch film according to claim 1, wherein the holes of neighboring rows of holes are staggered in relation to the main direction.

5. Stretch film according to claim 1, wherein the base is prestretched together with the strips.

6. Stretch film according to claim 1, wherein the width of each row of holes is equal to the diameter of said holes.

7. Stretch film according to claim 1, wherein a single row of holes is located between said respective pairs of adjacent strips, wherein said holes in each of said rows are aligned linearly.

* * * * *